2,819,173

SYNTHETIC FIBERS AND THE LIKE

Karl Dithmar, Frankfurt am Main, Germany, assignor to Deutsche Gold- und Silber-Scheideanstalt vormals Roessler, Frankfurt am Main, Germany No Drawing. Application October 19, 1953
Serial No. 387,032

Claims priority, application Germany October 21, 1952

8 Claims. (Cl. 106—166)

The present invention relates to improvements in the production of synthetic organic fibers, foils, films, bands and the like to provide products having substantially improved mechanical properties.

It has already been proposed to impart a mat or dull appearance to synthetic organic fibers such as viscose artificial silk, cuprammonium rayon, acetate rayon or fibrous materials of purely synthetic materials by suspending white pigments in the spinning solutions or masses and then spinning the resulting turbid solutions or masses in the usual manner. The pigments employed, especially titanium dioxide, are selected to be of such grain size that on one hand they have the best light reflecting properties and on the other hand do not clog the spinning nozzles. Experience has indicated that the best delustering effects are obtained with grain sizes of 600 to 1000 millimicrons. The known delustering pigments are incorporated in the spinning masses such as aqueous solutions of viscose or cuprammonium rayon or solutions of cellulose acetate in organic solvents, or the melts of the polymerizates employed in the production of fully synthetic fibers in as uniform and stable a dispersion as possible and such masses are then spun in the usual manner.

In accordance with the invention, it was unexpectedly found that substantially different and improved effects can be obtained by incorporating in such spinning solutions or masses finely divided water insoluble oxides of metals or metalloids, which are obtained by thermal decomposition of volatilized metal or metalloid compounds preferably in the presence of water vapor to form aerosols of such oxides which are recovered as aerogels. The oxides thus obtained are of substantially different character than the delustering pigments previously employed and furthermore produce different effects in the products in which they are incorporated. The thermal vapor phase decomposition employed to produce thet oxides used according to the invention is essentially a vapor phase hydrolytic decomposition effected by the water vapor present. An especially suitable procedure for the production of the oxides employed according to the invention has been described in application Serial No. 344,840, filed March 26, 1953, and generally consists in supplying the vaporized metal or metalloid compound such as tin tetrachloride, silicon tetrachloride, zinc chloride and the like into a decomposition zone heated to an elevated temperature by the combustion of hydrogen or a hydrogen containing combustible gas such as methane which upon combustion simultaneously furnishes the water vapor for the hydrolytic thermal vapor phase decomposition.

The particle size of the oxides employed according to the invention obtained by thermal, especially hydrolytic thermal vapor phase decomposition of metal or metalloid compounds is less than 150 millimicrons. While some of these oxides when employed in larger quantities can effect a certain clouding of the fibers or other products produced therewith, they cannot be classed as delustering pigments. Some of such oxides have nearly the same or the same refractive index as the material in which it is incorporated and consequently do not reflect any light when incorporated in such material. This, for example, is the case when silica obtained as an aerogel by hydrolytic thermal vapor phase decomposition is incorporated in cellulose acetate, as the refraction index of both the silica and the cellulose acetate is about 1.55 and consequently a delustering of cellulose acetate by incorporating such silica aerogel therein cannot be achieved.

The aerogel oxides employed according to the invention which are obtained as aerogels in the hydrolytic thermal vapor phase decomposition of volatile compounds of the corresponding metals have a special specific surface character which fundamentally differentiate such oxides from oxides produced by other means. It is believed that it is this surface characteristic of the oxide aerogels employed according to the invention which leads, as has been observed according to the invention, to the inner strengthening of the products in which such oxides are incorporated. This strengthening, for example, in the case of fibers, manifests itself in improvements in their mechanical properties such as resistance to abrasion, resistance to splitting and the like which naturally improves the durability as well as wearing characteristics of materials produced from such fibers.

The manner in which the oxide aerogels employed according to the invention are incorporated in the masses from which the fibers, foils, films, bands and the like are produced depends upon the individual material produced. The oxide aerogels can, for example, when aqueous spinning solutions are employed, be stirred into water, dilute aqueous sodium hydroxide or ammonia before they are incorporated into the spinning solution. As a general rule, the oxide aerogels, are incorporated at the same point in the process at which delustering pigments are usually introduced. In the case of fibers which are spun from solutions in organic solvents, such as is the case with, for example, cellulose acetate, the oxide aerogels can be stirred up in acetone or in the solvent mixture employed for the spinning solution and then incorporating the resulting suspension in the spinning solution. In the event that delustering agents are also to be incorporated, these can be mixed with the oxide aerogels employed according to the invention and the mixture can then be incorporated in the spinning mass. This modification has the advantage that the presence of the oxidic aerogels improves the stability of the delustering agent suspended in the spinning masses as it was found that the presence of such aerogels slows the rate of sedimentation of the pigments employed as delustering agents.

The incorporation of the oxide aerogels can also be affected at other points in the process than described above. For example, in the viscose process, the aerogels can be added to the sulfiding drums wherein the alkali cellulose is sulfided whereby a uniform dispersion of the aerogels is insured.

In the production of fibers and the like from completely synthetic materials such as nylon, Perlon, Orlon and Dacron fibers, the oxide aerogels can be incorporated in the melted spinning masses or they can be added to the starting materials either before or during the polymerization or polycondensation procedure.

The oxide aerogels can be employed alone or as indicated above, they can be employed in admixture with pigments or dyes. In all of such instances the incorporation of such oxide aerogels substantially improves the mechanical properties of the resulting products.

Fundamentally all metal or metalloid oxides produced by the hydrolytic thermal vapor phase decomposition of volatile metal or metalloid compounds in the form of aerosols or respectively aerogels can be employed to obtain the improved effects of the invention. For example, such oxides of tin, silicon, titanium, zirconium, aluminum, zinc, and the like can be employed. Mixtures of such oxides can also be employed. The oxide most adapted for the particular situation depends upon what other desirable effects can be achieved when such oxide is used. For example, if fibrous materials are to be produced which also possess good absorbency a silica aerogel produced by hydrolytic thermal vapor phase decomposition of volatile silicon compounds is preferred whereas if less absorbent or water repellent fibrous materials are desired, aluminum oxide or zirconium oxide aerogels produced in the same manner are more suited. On the other hand, titanium oxide aerogel has the advantage that it also has a greater propensity for reducing the undesired luster of synthetic fibers than other oxide aerogels. All of the oxide aerogels, however, have the common property of improving the mechanical properties of the fibers, foils, films, bands and the like in which they are incorporated. These improved mechanical properties are noticeable even with very small quantities of such oxide aerogels, for example, in quantities of about 0.05%. In practice as a rule larger quantities are employed which can be up to 10%. Preferably the amount incorporated is between 0.1% and 2%.

The following examples will serve to illustrate several modifications of the invention.

*Example 1*

A silica aerogel obtained by the thermal decomposition of silicon tetrachloride in the vapor phase in the presence of water vapor to produce an aerosol which upon cooling collects as the aerogel, which can be bought in commerce under the trademark "Aerosil," was suspended in a viscose solution such as is customarily employed in the production of viscose artificial silk in a quantity amounting to 0.3% (calculated on the cellulose content of the solution). This suspension was then spun in the usual manner to artificial silk. In comparison to artificial silk produced from the same viscose solution, but omitting the silica aerogel, the silica containing artificial silk had substantially improved mechanical properties. For example, when tested for resistance to abrasion on a "Schopper" apparatus, it was found that the silica aerogel containing artificial silk required 1342 rubbings before light splitting of the fibers could be observed under a microscope whereas an artificial silk not containing the silica aerogel only withstood 682 rubbings before such splitting occurred.

*Example 2*

A silica aerogel as described in Example 1 was suspended in a cuprammonium solution of cellulose such as is customarily employed in the production of cuprammonium rayon in a quantity amounting to 0.3% (calculated on the cellulose content of the solution). After spinning such suspension a cuprammonium rayon was obtained which had substantially greater resistance to abrasion than a rayon produced under the same conditions but omitting the silica aerogel. The number of rubbings upon a Schopper apparatus required to produce a barely recognizable splitting of the silica aerogel containing cuprammonium rayon was 394, whereas only 180 rubbings were withstood by the cuprammonium rayon which did not contain the silica aerogel.

*Example 3*

A silica aerogel as described in Example 1 was suspended in a viscose solution such as is customarily employed in the production of viscose rayon in an amount between 0.2 and 0.5% (calculated upon the cellulose content of the solution). This suspension was then extruded through a slit-shaped nozzle into a precipitating bath containing sulfuric acid and sodium sulfate. The resulting foil was then washed free of acid in a number of baths and dried. The resulting silica aerogel containing foil was practically glass clear and possessed a substantially greater resistance to abrasion than a similar foil containing no silica aerogel.

When corresponding amounts of titanium dioxide aerogel obtained by vapor phase thermal decomposition of titanium tetrachloride in the presence of water vapor to form an aerosol which was collected as an aerogel, were employed in place of the silica aerogel, a cellulose foil was obtained which also posessed substantially improved mechanical properties and in addition a delustering effect to a greater or lesser extent depending upon the amount of titanium dioxide aerogel incorporated.

*Example 4*

2000 grams of a titanium dioxide aerogel obtained in the manner described in Example 3 and having an average grain size of 80 millimicrons were suspended in 8000 grams of water with a rapidly rotating stirrer. 2.5 kilograms of the resulting 20% titanium dioxide containing suspension and 17.5 kilograms of water were then intimately mixed with a spinning mass obtained by the condensation of adipic acid and hexamethylene diamine. This mixture was then spun in the usual manner from the melt to adipamide (nylon) fibers. The resulting fibers had a pleasing dull luster and possessed improved mechanical properties as well as a good manufacturing quality, such as, for example, in knitting and weaving.

*Example 5*

500 grams of a titanium dioxide aerogel produced by a gas phase thermal decomposition whose grain size was from 5 to 150 millimicrons were suspended in 500 grams of dimethylformamide with the aid of a rapidly rotating stirrer or a three roll mill. The suspension was then mixed in a spinning solution of polyacrylonitrile in dimethylformamide containing 100 kilograms of polyacrylonitrile. The spinning solution containing the suspended titanium dioxide aerogel was then passed through cloth filters and filter candles and spun to polyacrylonitrile fibers (Orlon fibers) in the usual manner. The resulting Orlon fibers which contained about 0.5% of titanium dioxide had a pleasing dull luster as well as a moderated surface smoothness. The moderated surface smoothness imparts good manufacturing qualities thereto especially in spinning when such fibers are combined with wool or other natural fibers.

I claim:

1. In a process for the production of shaped synthetic products of the nature of fibers, foils, films and bands from spinning masses, the steps which comprise incorporating a finely divided oxide aerogel selected from the group consisting of silica, aluminum oxide, zirconium oxide and titanium oxide aerogels obtained by a vapor phase thermal decomposition of a chloride selected from the group consisting of silicon, aluminum, zirconium and titanium chlorides by supplying such chloride in the vapor state to a decomposition zone heated directly to an elevated temperature by the combustion of a hydrogen containing combustible gas to form an oxide aerosol which is recovered as the aerogel in such spinning masses and spinning such oxide aerogel containing spinning masses to form a shaped product.

2. The process of claim 1, in which said oxide aerogel is a silica aerogel.

3. The process of claim 1, in which said oxide is a titanium dioxide aerogel.

4. The process of claim 1, in which the quantity of oxide aerogel incorporated in the spinning mass is such that the shaped product produced therefrom contains from 0.05% to 10% of said oxide aerogel distributed therein.

5. The process of claim 1, in which the quantity of oxide aerogel incorporated in the spinning mass is such that the shaped product produced therefrom contains from 0.1% to 2% of said oxide aerogel distributed therein.

6. A synthetic organic fiber having 0.05% to 10% of a finely divided water insoluble oxide aerogel selected from the group consisting of silica, aluminum oxide, zirconium oxide and titanium oxide aerogels obatined by a vapor phase thermal decomposition of a chloride selected from the group consisting of silicon, aluminum, zirconium and titanium chlorides by supplying such chloride in the vapor state to a decomposition zone heated directly to an elevated temperature by the combustion of a hydrogen containing combustible gas to form an oxide aerosol which is recovered as the aerogel.

7. A synthetic organic fiber according to claim 6, in which said oxide aerogel is a silica aerogel.

8. A synthetic organic fiber according to claim 6, in which said oxide aerogel is a titanium dioxide aerogel.

References Cited in the file of this patent

UNITED STATES PATENTS

| | | |
|---|---|---|
| 2,042,702 | Dreyfus | June 21, 1936 |
| 2,052,558 | Dreyfus | Sept. 1, 1936 |
| 2,121,408 | Raspe et al. | June 21, 1938 |

FOREIGN PATENTS

| | | |
|---|---|---|
| 193,583 | Switzerland | Jan. 17, 1938 |
| 389,518 | Great Britain | Mar. 16, 1933 |

OTHER REFERENCES

White et al.: Jour. Ind. and Ang. Chem. 33 (1944).